(12) United States Patent
Henry

(10) Patent No.: US 6,511,202 B1
(45) Date of Patent: Jan. 28, 2003

(54) LIGHT EMITTING DIODE 9-VOLT BATTERY SNAP FLASHLIGHT

(76) Inventor: Benjamin Victor Duane Henry, 512 Humbred La., Grants Pass, OR (US) 97527

( * ) Notice: Subject to any disclaimer, the term of this patent is extended or adjusted under 35 U.S.C. 154(b) by 0 days.

(21) Appl. No.: 09/587,173

(22) Filed: Jun. 2, 2000

(51) Int. Cl.[7] ................................................. F21L 4/00
(52) U.S. Cl. ...................................... 362/195; 362/800
(58) Field of Search ................................ 362/194, 195, 362/200, 202, 205, 800

(56) References Cited

U.S. PATENT DOCUMENTS

| | | | |
|---|---|---|---|
| 4,864,474 A | | 9/1989 | Maglica ........................ 362/203 |
| 5,313,187 A | | 5/1994 | Choi et al. ..................... 362/800 |
| 5,313,188 A | | 5/1994 | Choi et al. ..................... 362/800 |
| 5,806,961 A | * | 9/1998 | Dalton et al. ................. 362/184 |
| 5,931,562 A | * | 8/1999 | Arato ............................. 362/205 |
| 6,095,661 A | * | 8/2000 | Lebens et al. ................ 362/800 |
| 6,145,999 A | * | 11/2000 | Van Derlande ............. 362/195 |
| 6,168,288 B1 | * | 1/2001 | St. Claire ...................... 362/800 |
| 6,231,207 B1 | * | 5/2001 | Kennedy ....................... 362/194 |

OTHER PUBLICATIONS

Ed Lillis and Jon Tiedemann; Home Power (magazine): White LED Enlightenment; Jun./Jul. 1999; 2 pages.

* cited by examiner

Primary Examiner—Sandra O'Shea
Assistant Examiner—Peggy A Neils
(74) Attorney, Agent, or Firm—Birdwell, Janke & Durando, PLC

(57) ABSTRACT

A high-low light-emitting diode glow-in-the-dark flashlight. The flashlight includes an end cap assembly that snaps onto the top of a 9-volt battery. The battery functions as both a power source and a handle. The end cap assembly includes a highly efficient and high brightness LED and a switch that turns the light on and off. A spot on the flashlight glows when turned off, allowing the flashlight to be easily located in the dark. The end cap assembly further includes a 9-volt battery snap that releasably connects to the terminal of a conventional 9-volt battery. The end cap assembly simply snaps on and off the terminal end of the battery. In another embodiment, a glow-in-the-dark housing fits over the end cap assembly. The flashlight is small and lightweight.

5 Claims, 2 Drawing Sheets

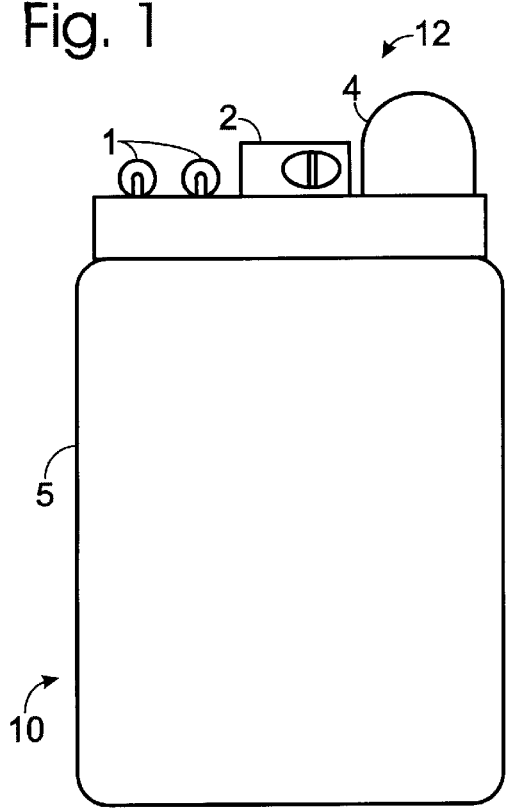
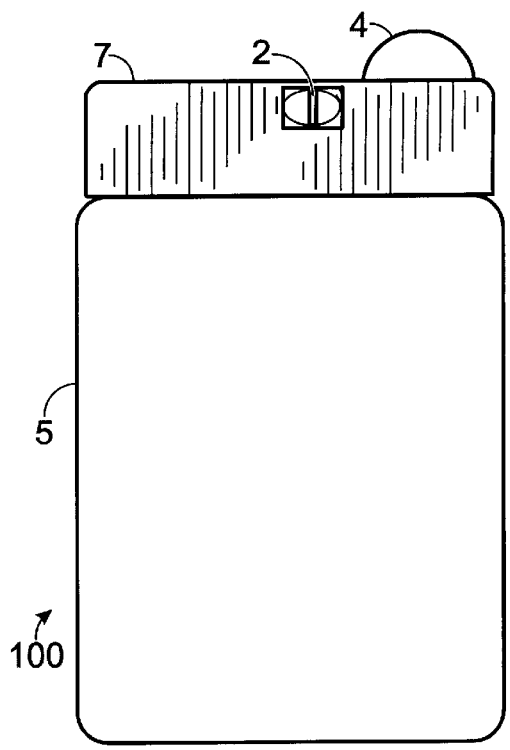
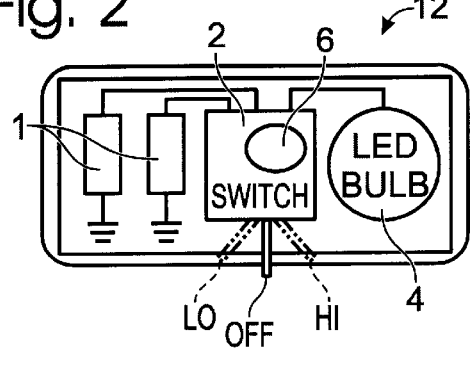
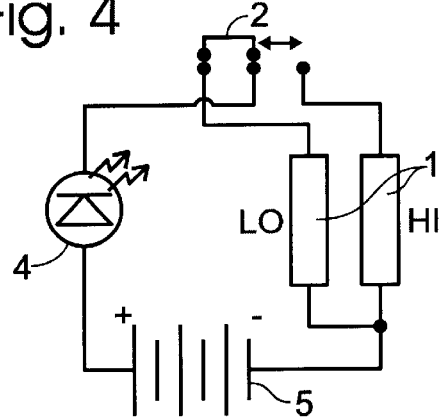
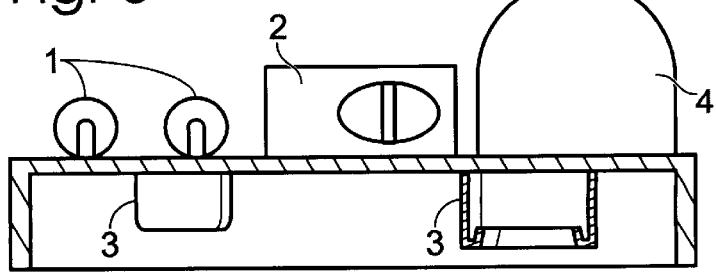

LIGHT EMITTING DIODE 9-VOLT BATTERY SNAP FLASHLIGHT

FIELD OF THE INVENTION

The present invention relates to the field of flashlights, and more particularly to a flashlight having a light-emitting diode (LED) as its light source.

BACKGROUND OF THE INVENTION

Illuminating light sources, such as fluorescent lamps and halogen light bulbs have been used in various conventional illuminating devices for different types of flashlights. However, these light sources generally have problems. They generate a large amount of heat, they have poor resistance to vibration, and they consume a large amount of power. In addition, illuminating devices that use these light sources require the replacement of burned-out lamps, and the devices are generally large in size. Moreover, they require frequent battery changes, which is inconvenient and costly to the customer. Therefore, these light sources are not adequate in terms of practical usability, for instance, in long distance hiking.

A prior art flashlight, the PA-Light, is shown in FIG. 6. It includes a plastic housing that has 9-volt battery style terminals therein. The housing snaps onto the top of a 9-volt battery and covers the battery's top half. A circuit board is mounted on top of the plastic housing. A heavy rubber housing covers the 9-volt battery, the plastic housing, and the circuit. The rubber housing includes a bottom half and a top half which has a built-in reflector and a magnifying lens that magnifies light from the light-emitting diode bulb into a sealed beam. The top half slides over the top of the plastic housing and the bottom half slides over an end of the battery. A metal band holds the rubber housing together. A disadvantage of this device is that it is heavy, weighting 84 grams with the battery. It is also quite large which makes it uncomfortable when kept in a pocket, and inconvenient when both hands are needed because it is too large to hold in a person's mouth. In addition, the rubber housing is sticky, which makes it hard to get it in and out of a pocket. Another disadvantage is that it is always on a glow mode, even when it's not being used. According to the manufacturer, the PA-Light will glow for only four years; thus the shelf life is limited to four years, and less time if it is used. Also, the battery does not last long when the flashlight is being used. With a 9-volt battery, the PA-Light only lasts for 100 hours on low, 24 hours on high, and 100 hours on a blinking mode.

Another prior art device is the "Micro-Light," which is shown in FIG. 7. It includes a plastic housing having a bottom and top portion. The bottom portion holds the battery and the light-emitting diode bulb. The top portion of the housing snaps on over the battery and the light-emitting diode bulb. The top portion also includes a button switch that, when pressed, pushes one of the light-emitting diode's leads onto the battery to turn on the flashlight. A disadvantage of this device is that it is often difficult to acquire replacement batteries while hiking. It is also difficult to replace the battery, and requires prying open the casing with a small screwdriver or with a knife. In addition, when using the lithium coin cell batteries, the Micro-Light will only last 12 hours. Another disadvantage is that the flashlight is difficult to hold because it is so small.

An additional prior art flashlight is the "Solitaire" single cell AAA, which is shown in FIG. 8. The flashlight includes a round aluminum pipe with a front cap that contains the lens and reflector. The front cap screws onto one end, while the battery slides into the other end. A plug with a spring screws onto the end containing the battery in order to hold and connect it. The front end that contains the reflector is rotated clockwise to turn on, and counterclockwise to turn off. A disadvantage of this device is that it uses an inefficient incandescent bulb, which lasts only about ten hours. It requires an AAA alkaline battery, which lasts for only about 2 hours. Also, it is difficult to turn on the device with one hand. This type of flashlight is illustrated in U.S. Pat. Nos. 4,577,263, 4,656,565, 4,658,336, 4,851,974, 4,864,474, 4,899,265, 4,942,505, and 5,003,440.

Another prior art device is the "VistaLite 300 series" red emitting bicycle tale light, which is shown in FIG. 9. The light includes a bottom plastic housing which holds two AA batteries. A circuit board is mounted to the middle of the bottom housing and contains three light-emitting diode bulbs, two resistors, a transistor, and a switch. A red lens covers the housing and snaps onto the bottom thereof. A disadvantage of this device is that it is heavy and inefficient. The light draws is 66 milliamps in the on position and 33 milliamps in the blinking position. This type of flashlight is illustrated in U.S. Pat. Nos. 5,313,187 and 5,313,188.

Therefore, there is a need to provide a flashlight that is lightweight, small in size, slides in a pocket easily, has a long shelf life, has a long running time, can be quickly turned on, and has an easy to find power source that can be replaced simply and quickly.

SUMMARY OF THE INVENTION

The high-low LED flashlight of the present invention solves the aforementioned problems and meets the aforementioned needs by providing a flashlight having an end cap assembly that is snapped onto the top of a 9-volt battery. The battery functions as both a power source and a handle. The end cap assembly includes a highly efficient and high brightness LED and a switch that turns the flashlight on and off. Alternatively, a three-mode switch can be used to control the intensity of the light. A spot on the flashlight glows when turned off, allowing the flashlight to be easily located in the dark. The end cap assembly further includes a 9-volt battery snap that releasably connects to the terminal of a conventional 9-volt battery. The end cap assembly simply snaps on and off the terminal end of the battery, covering the terminals and providing safe operation of the flashlight. The present invention is of such compact size and low weight as to be suitable for single-handed portable operation by a user. In another embodiment, a glow-in-the-dark housing fits over the end cap assembly.

Therefore, it is a principal object of the present invention to provide a novel and improved flashlight.

It is another object of the present invention to provide a flashlight of simple construction that is small and lightweight.

It is yet another object of the present invention to provide a flashlight that is portable and slides easily and smoothly into a pocket.

It is a further object of the present invention to provide a flashlight that has a low current, a long running time and a long shelf life.

It is a still further object of the present invention to provide a flashlight that glows in the dark, and that turns on quickly and easily.

It is an even further object of the present invention to provide a flashlight that has a power source that is easy to find and simple and easy to replace.

The foregoing and other objects, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of a first embodiment of a flashlight according to the present invention.

FIG. 2 is a perspective view of an end cap assembly of the flashlight of FIG. 1.

FIG. 3 is a cross-sectional view of the end cap assembly of the flashlight of FIG. 1.

FIG. 4 is an electrical circuit block diagram of the flashlight of FIG. 1.

FIG. 5 is a side view of a second embodiment of a flashlight according to the present invention.

DETAILED DESCRIPTION OF THE DRAWINGS

Figure 6:
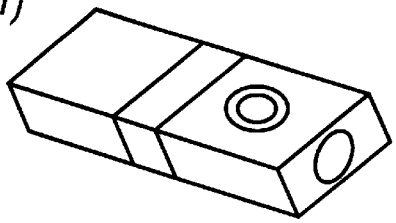
FIG. 6 is a view of a prior art "PA-Light."
Figure 7:
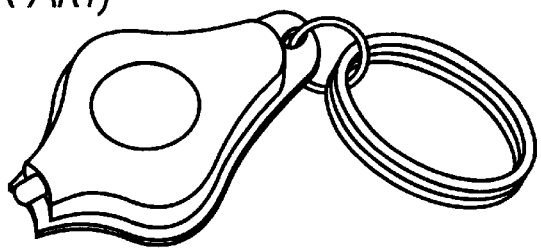
FIG. 7 is a view of a prior art Photon "Micro Light."
Figure 8:
FIG. 8 is a view of a prior art Mag-Lite "Solitaire."
Figure 9:
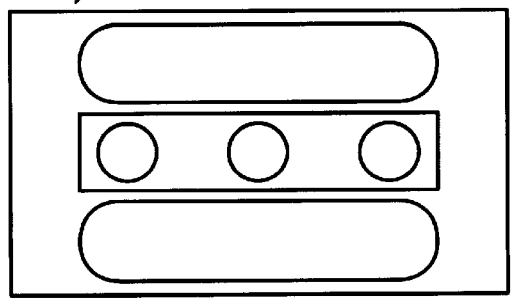
FIG. 9 is a view of a prior art VistaLite "300 Series" with a red lens cover housing removed, revealing its electrical components.

A high-low LED flashlight 10 according to the present invention is shown in FIG. 1. The flashlight 10 includes a light-producing end cap assembly 12 that snaps onto a battery 5, which provides power to the end cap assembly 12. The end cap assembly 12 covers less than ¼ of the length of the sides of the battery 5.

As shown in FIG. 2, the end cap assembly 12 includes one or more resistors 1 and a durable three-mode toggle switch 2 in the middle of the end cap assembly 12. The switch 2 controls a light-emitting diode bulb 4 (LED). The end cap assembly 12 further includes a glow-in-the-dark spot 6 which glows for approximately two hours after the flashlight 10 has been turned off so that the flashlight 10 can quickly and easily be found in the dark.

As shown in FIG. 3, the end cap assembly 12 further includes a 9-volt battery snap 3, which includes battery style metal terminals that snap into corresponding metal terminals on the battery 5. The smaller snap on the left snaps into the cathode terminal on the battery and the larger snap on the right snaps into the anode terminal on the battery.

After the end cap assembly 12 has been snapped onto the battery, the flashlight is turned on by moving the switch 2 from the off position to either the low or high position, which activates the LED. FIG. 4 is a diagram of the circuit. When the switch 2 is turned on, a closed circuit is formed. Electrical current flows from one terminal of the 9-volt battery 5 through the resistors 1, and then passes through the switch 2. The current then flows into the light-emitting diode bulb 4, causing the bulb to light up. The current then flows back to the other battery terminal, thus completing the closed circuit.

FIG. 5 shows an alternative embodiment of a high-low LED flashlight 100 according to the present invention. The flashlight 100 of FIG. 5 is similar to the flashlight 10 of FIG. 1, except that the flashlight 100 of FIG. 5 includes a glow-in-the-dark housing 7 that fits over the end cap assembly. As an alternative, the housing 7 could also be constructed so that it does not glow-in-the-dark. In addition, the flashlight can be constructed with any of the above combinations.

Although there are two resistors shown in FIG. 4, the flashlight can be constructed with only one resistor. When only one resistor is used, the toggle switch has only two modes, on and off. Different types of resistors can be used to form the circuit such as a ⅛ watt carbon-film±5% tolerance, a ¼ watt carbon-film±5% tolerance, a ½ watt carbon-film±5% tolerance, a diode, a diode voltage regulator, or a transistor. One or more can be used in combination when constructing the circuit. The toggle switch 2 shown in the Figures lasts for 100,000 operations. As an alternative, other types of switches can be used such as a push-button, a slider, a thumbwheel, a pushwheel, or a potentiometer. One or more of the switches can be used when constructing the flashlight. The above lists are just examples, and other types of resistors and switches can be used without departing from the principals of the invention.

Different types of coatings can be used when constructing the flashlight such as heavy duty rubber, plastics (including plastic cap), Bondo (body filling for automobiles), silicone or other sealants, paint, epoxy, or glues. One or more of the different coatings can be used.

Glow-in-the-dark paint or a glow-in-the-dark cap can be used individually, or in combination when constructing the flashlight. In addition, different color LED bulbs can be used individually or together to form the circuit. Some example colors are white, red, blue, green, or amber.

The flashlight is approximately 60 mm high, 26.5 mm wide and 17.5 mm thick with the battery, which is quite small. It weights around 43 grams, which is about ½ the weight of the prior art devices. The battery 5 is preferably a 9-volt lithium battery, which lasts for 1200 hours on low, 200 hours on high and a 10-year shelf life. However, other types of batteries can be used without departing from the principals of the invention. The LED bulb 4 lasts for 100,000 hours and illuminates a number four on our light meter, when the switch 2 is in the high position on a new battery. The flashlight draws less than ⅕.5 times the power of the prior art devices on high and draws less than ¹⁄₁₆.5 times the power of the prior art devices on low.

The small high-low LED flashlight, of the present invention has endless uses such as for backpacking, camping, power outages, etc. Some advantages of the flashlight are that it has a low current and a highly efficient 100,000 hour LED bulb, which results in a long battery life. The flashlight has a simple construction for durability. The flashlight is optimized for the highest light output/energy usage ratio.

Also, the flashlight needs to have something around the terminals of the 9-volt battery so that when it is in someone's pocket his or her keys will not accidentally short out the battery and cause burns. This can be accomplished by several ways, the following are not to limit the scope, but rather to provide an example: a piece of shrink tubing cut to fit around the terminals only, or a piece of shrink tubing cut to fit around the 9-volt battery snap and to proceed down the battery, but not more then ¼ the total length of the 9-volt battery's body, or a 9-volt battery that has plastic that hangs down and covers the terminals, or a 9-volt battery snap that covers the battery snap down to around ¼ the total length of the battery's body or less.

In order to construct the high-low LED flashlight, start with a 9-volt battery snap 3 that has two 9-volt battery style metal terminals on one side. The big snap is the anode side and the smaller snap is the cathode side, and they will be on the bottom. Glue the switch 2 to the 9-volt battery snap 3. Put glue on the switch 2 and position it just to the cathode side of the middle on the snap.

Next, look inside the light-emitting diode bulb 4 to see two wires almost touching. Notice that the anode goes up and stops while the cathode goes up and proceeds horizontally and then stops. Take the cathode of the light-emitting diode and bend it 90° away from the anode. Then, put the anode of the light-emitting diode bulb 4 in the hole of the anode side of 9-volt battery snap 3 and solder it. Next, bend the cathode of the light-emitting diode bulb 4 up and around to the middle wire on the switch 2 and solder.

Take a 300–560 ohm resistor 1 and put one lead in the hole of cathode side on the 9-volt battery snap 3 and solder. Then, bend the other lead up and around to the nearest wire on the back of the switch 2 and solder.

If using the switch 2 with the with three modes, take a 1K–6K ohm resistor 1 and put one lead in the cathode side hole of the 9-volt battery snap 3 and solder. Bend and solder the other lead to the switch 2 lead that is closest to the light-emitting diode bulb 4.

Next, test the flashlight. Snap the assembly created above to a 9-volt battery 5 and push the switch 2 toward light-emitting diode bulb 4. The flashlight should light up in the high mode. Move the switch 2 to middle position, the flashlight should be off. Finally, move the switch 2 away from the light-emitting diode bulb 4 as far as it will go, (if switch 2 has optional position) the flashlight should be on low. If the test fails, fix the problem before going on to the next step.

When using the 9-volt battery snap with a glow-in-the-dark housing 7, snap the housing over the top of the end cap assembly so that the light-emitting diode bulb 4 goes through the hole in the housing. When using the 9-volt battery snap with glow-in-the-dark plastic housing 7, skip the coating and painting step.

Next, apply the heavy-duty-rubber coating. Afterwards, dab a drop of glow-in-the-dark paint 6 on top of the switch 2 using a small paintbrush.

Finally, cut a piece of shrink tubing 5 mm wide, with a circumference of 54 mm. This piece of shrink tubing will go around the light-emitting diode 9-volt battery snap and the 9-volt battery's connecting terminals to avoid accidental shortage of the battery.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A flashlight, comprising:
   a) a battery which comprises a first battery contact and a second battery contact, each contact located on an upper surface of said battery;
   b) a connection means for releasably attaching to said first battery contact and said second battery contact;
   c) at least one light emitting diode having a pair of terminals, said light emitting diode being mounted to said connection means;
   d) an end cap housing mounted on said connection means, said end cap housing covers said first battery contact and said second battery contact when said connection means is connected to said battery;
   e) a circuit within said end cap housing interconnecting said at least one light emitting diode to said battery for providing power to said at least one light emitting diode;
   f) said circuit further including means for limiting electrical current to said at least one light emitting diode; and
   g) said battery, when connected to said connection means, is the power source and the handle for said flashlight.
   wherein the flashlight is of such compact size and low weight as to be suitable for single-handed portable operation by a user, the flashlight further having a purpose of providing general-purpose illumination.

2. The flashlight of claim 1, wherein said end cap housing of said flashlight is made from rigid plastics.

3. The flashlight of claim 2, wherein said end cap housing of said flashlight is formed of a glow-in-the-dark plastic-like material.

4. The flashlight of claim 1, further comprising a switching device dispose within said end cap housing for switching said at least one light emitting diode to said battery in order to energize said at least one light emitting diode.

5. The flashlight lamp of claim 4, wherein said switch is selected from the group comprising toggle, rocker, slider, rotational, thumbwheel, pushwheel, potentiometer, and push-button.

* * * * *